July 22, 1941.    M. KLAVÍK    2,250,382

MOTOR VEHICLE HAVING AIR-COOLED REAR ENGINE

Filed July 26, 1939

Patented July 22, 1941

2,250,382

UNITED STATES PATENT OFFICE 2,250,382

MOTOR VEHICLE HAVING AIR-COOLED REAR ENGINE

Milos Klavík, Prague-Smichov, Czechoslovakia

Application July 26, 1939, Serial No. 286,715
In Czechoslovakia April 9, 1938

3 Claims. (Cl. 180—54)

This invention relates to an arrangement of blowers for air cooled engines having cylinder blocks in V-arrangement, namely for vehicles with rear engines.

It has already been proposed to dispose over the gear box the blowers or impellers for cooling engines having cylinders in series. This arrangement is not adapted for use for engines with cylinders in V-arrangement and for this reason, according to the invention, the air cooling system is arranged so that the blowers are disposed on the sides of the gear box. The drive of the blowers or impellers can be carried out very easily by means of a common transverse shaft, which may be driven by a countershaft or another shaft, that is constantly driven, in the gear box, from the engine.

Figure 1:
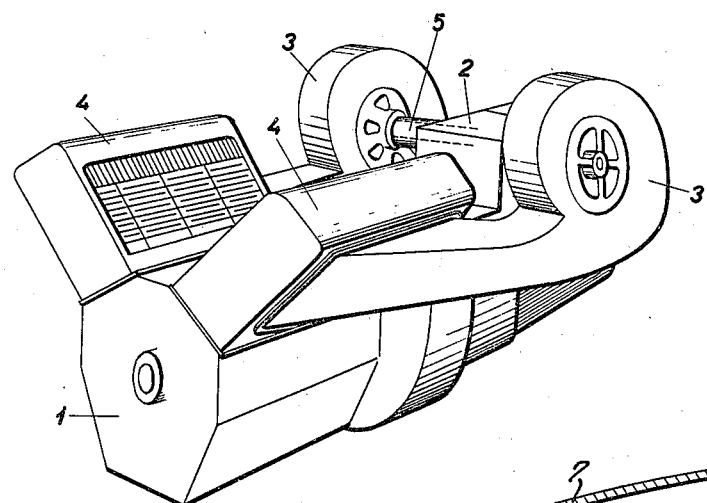
Figure 2:
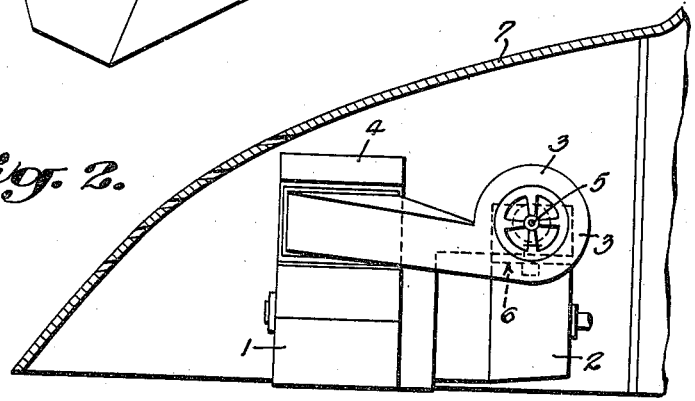

An example of one embodiment of the invention is illustrated in the drawing in which Fig. 1 is a perspective view of an engine and gear box unit equipped with my invention. Fig. 2 is a side elevation of the same showing it located in the rear compartment of a motor vehicle.

The engine 1 with cylinder blocks in V-arrangement has mounted on the side of the gear box 2 two blowers or impellers 3 each of which blows the cooling air onto one series 4 of cylinders. The drive of the blowers is effected by the common shaft 5 which receives its movement from the countershaft or another suitable shaft 6 of the gear box.

What I claim and desire to secure by Letters Patent is:

1. In combination, a motor vehicle having an engine at the back, said engine comprising cylinders disposed in V-arrangement, a gear box, a common transverse shaft, and another continuously driven shaft of the gear box connected to drive said common transverse shaft, and a blower or impeller for each series of cylinders built into the sides of the gear box and driven by the common transverse shaft from the continuously driven shaft.

2. In a motor vehicle having an engine at the rear, said engine having its cylinders disposed in V-arrangement, a gear box including a continuously driven shaft, a common transverse shaft, driven by said continuously driven shaft, a blower for each row of cylinders, said blowers being mounted at the sides and over the gear box and driven by said common transverse shaft.

3. In a motor vehicle having an engine at the rear, said engine being of the V-type, a gear box, a common transverse shaft and another continuously driven shaft in the gear box, and a blower for each row of cylinders built at the upper sides of the gear box and driven through said common transverse shaft by said continuously driven shaft.

MILOS KLAVÍK.